Aug. 26, 1969  M. H. KATZ ET AL  3,463,014
METHOD AND APPARATUS FOR ASCERTAINING THE
CHARACTERISTICS OF FOOD PRODUCTS
Filed Dec. 7, 1966

INVENTORS
MORRIS H. KATZ
WILLIAM F. HENRY
BY
Ronald E. Lund
ATTORNEY

United States Patent Office 3,463,014
Patented Aug. 26, 1969

3,463,014
METHOD AND APPARATUS FOR ASCERTAINING THE CHARACTERISTICS OF FOOD PRODUCTS
Morris H. Katz, St. Louis Park, and William F. Henry, Minneapolis, Minn., assignors to The Pillsbury Company, Minneapolis, Minn., a corporation of Delaware
Filed Dec. 7, 1966, Ser. No. 599,921
Int. Cl. G01n 33/02
U.S. Cl. 73—432    12 Claims

ABSTRACT OF THE DISCLOSURE

The short gel characteristics of ductile compositions (e.g., smooth, creamy consistency thereof) can be objectively ascertained by contacting the surface of a ductile composition with a smooth surfaced member and adhesively withdrawing the ductile composition in the form of a filamentous mass until it ruptures. The length of the resulting filament to its point of rupture is an objective measurement of the ductile mass short gel character.

---

This invention relates to a method of objectively ascertaining the characteristics of ductile compositions and apparatus therefor. More particularly, the present invention relates to a method of ascertaining the short gel characteristics of ductile compositions and apparatus for ascertaining the same.

Heretofore, it has been the practice of the art to measure the short gel characteristics of edible ductile food compositions by subjective means. Such subjective means are generally conducted by subjecting the product to be tested to a series of taste panel tests. Although such panel tests are useful in determining the short gel character of the desired product, such a mode of testing fails to provide adequate and definitive perimeters as to desired properties of the resultant product. The results of such testing are often confused by other ingredients within the tested food product. Due to the rudimentary manner of testing, small but significant difference in respect to the short gel characteristics thereof are often overlooked and not given appropriate evaluation.

It is an object of the present invention to provide an objective method and apparatus for ascertaining the short gel character of ductile compositions.

Another object of the invention is to provide an economical method and apparatus for ascertaining short gel characteristics of ductile compositions.

According to the present invention, there is provided a method for objectively measuring the short gel characteristics of ductile compositions, said method comprising:

(a) Providing a ductile mass;
(b) Adhesively withdrawing at least a portion of the mass in the form of a filamentous mass at a constant speed;
(c) Continually withdrawing the mass until the filamentous mass ruptures; and,
(d) Ascertaining the short gel characteristics of the composition by measuring the distance said filamentous mass has traversed until the rupture thereof.

Figure 1:
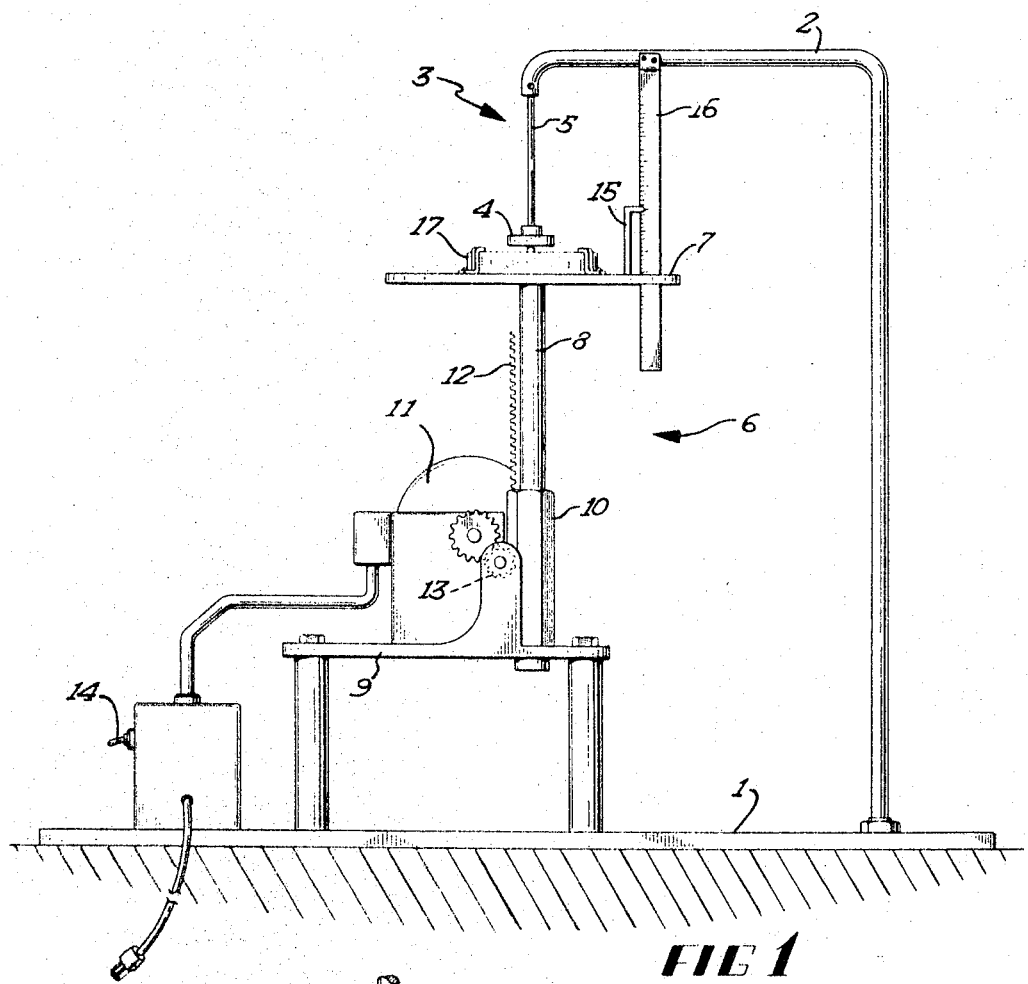
FIGURE 1 depicts an apparatus suitable for measuring short gel characteristics.

The short gel characteristics of ductile compositions may be ascertained by the apparatus illustrated in FIGURE 1 which in general comprises a supporting member, a containing means provided on the supporting member, an adhesively engaging means carried by the supporting member for adhesively engaging the surface of said composition, a separating means adapted to separate the containing means and the engaging means and a measuring device adapted to ascertain the degree of separation between the containing and engaging means.

A vertically movable testing platform which is indicated generally at 6, consists of a circular platform 7 carried by vertical rod 8 which is in turn supported by lower platform 9 attached to base member 1. Vertical rod 8 is mounted within sleeve 10 and is adapted to be moved upwardly and downwardly by vertical constant speed, reversible electric motor 11 operating through rack and pinion 12 and 13. Motor 11 is shown connected to a power supply through switch 14.

A measuring device adapted to ascertain the degree of separation between the containing means and adhesive engaging means is depicted in FIGURE 1 as a rigidly affixed scale indicator 15 supported by the circular platform 7 which cooperated with calibrated scale 16 (in mm.) which is rigidly attached to verticle support member 2.

In operation, a sample material is placed within any suitable container (i.e., a containing means), such as a petri dish 17. The petri dish 17 is placed upon circular platform 7 in a position preferably substantially coaxial with disc 4. Platform 7 is raised until the lower plane surface of disc 4 is in complete contact (i.e., flush with the disc's 7 lower plane surface) with the sample in petri dish 17. Upon the disc's contact with the surface of the sample material, disc 7 adhesively engages the contacted material. Upon contact, switch 14 is disengaged and an initial reading is taken from scale 16. Motor 11 is then engaged to lower platform 7 at a constant speed thus providing a means to separate the engaging means from the containing means.

Figure 2:
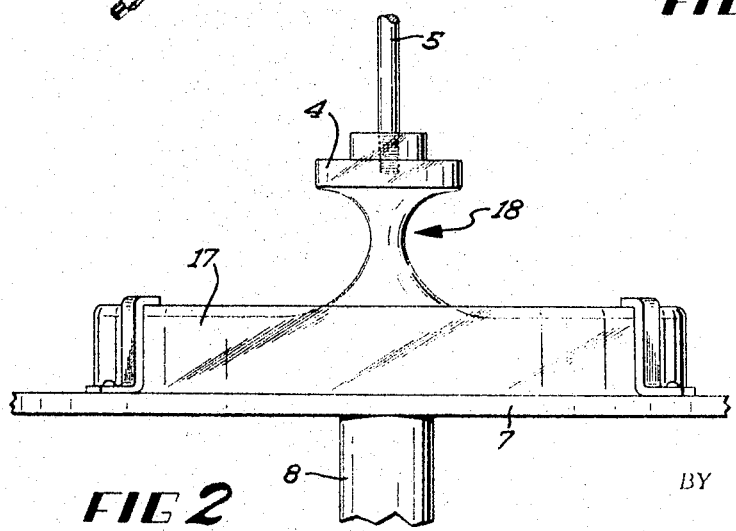
FIGURE 2 is an enlarged, fragmentary elevational view of the apparatus depicted in FIGURE 1 engaged in measuring the short gel characteristics of a ductile food composition.

As shown in FIGURE 2, an adhesive attraction exists between the sample contained in petri dish 17 and disc 4, thus a portion thereof is withdrawn from the petri dish in the form of filamentous mass 18. Platform 7 is lowered at constant speed until the filamentous mass 18 is ruptured at which point a second reading is taken from scale 16 (e.g., motor 11 is stopped and a second reading is taken). The difference in millimeters between the initial and second reading is indicative of the sample's short gel character.

For purposes of this application, an apparatus as described above having the following dimensions and characteristics was constructed.

calibrated scale 16—calibrated in millimeters
circular platform speed—suitably geared to provide a constant speed of 25.4 mm./15 seconds
disc 4—transparent, plastic, circular disc having a lower plane surface diameter of 1 inch and a vertical thickness of ½ inch
petri dish 17—circular diameter of 2¾ inches and a vertical thickness of ½ inch Using this apparatus, stringy products in contradistinction to those having a short gel character provide a relatively high reading (e.g., 81 mm.). Short gel readings for products of a fine, smooth, creamy consistency are usually less than 35 mm. and most generally range from about 5 mm. to about 30 mm. Stability of reconstituted and aerated products can be ascertained by subsequent test runs, for example, at 15, 45, 140 and 180 minutes. In such subsequent test runs, products which are relatively stable provide almost identical short gel readings.

Variables which will effect the short gel characteristics of a particular food ingredient include temperature, amount of water and food ingredient, disc size, configuration and withdrawal speed. Thus, it should be apparent that a somewhat different apparatus or a modified test procedure will provide different short gel readings; however, these readings, when conducted under constant testing conditions, provide correlative values to those specifically described herein.

The recitation ductile composition as employed herein refers to compositions which can be adhesively engaged and withdrawn by an adhesively engaging means. These compositions are generally characterized as having a viscosity higher than water and contain a liquid dispersing agent such as water and a dispersed material. Although water is the preferred dispensing agent, other agents such as ethanol, carbon tetrachloride, methyl ethyl ketone, benzene, toluene and phenol may be employed. Typical dispersed materials include gelatinized and ungelatinized starches, thickeners such as locust bean gum, gum tragacanth, pectin, carboxymethylcellulose, methyl and ethyl cellulose, guar gum, methyl and ethyl cellulose, sodium caseinate, hydrolyzed soy protein, egg albumin and the like.

The ductile compositions may be in aerated or non-aerated form. Such compositions are usually in the form of an aqueous colloidal suspension containing at least 10 weight percent water and preferably greater than 30 weight percent water. Illustrative ductile food compositions adaptable to the present invention are aerated food products of a fine, smooth, creamy consistency such as cream, fillings, custards, unfrozen ice creams and sherbets, puddings, toppings, icings, frostings and the like.

The recitation "short gel characteristics" referred to herein is directed to the inherent properties of a ductile composition. Such inherent properties will differ from one ductile composition to another and may range over a broad spectrum from a sticky, stringy mass (e.g., glues) to one of a fine, smooth, creamy consistency (e.g., a whipped topping). The "short gel readings" obtained via the disclosed apparatus and methodology provide an objective means for ascertaining precisely wherein a particular ductile composition falls within this spectrum.

The following examples are illustrative of the invention:

Example I

The following thickening agents and amounts thereof as indicated in Table I were added to a solution of 472 ml. of water and 220 grams of sugar. The amount of thickening agent added to the solution was sufficient to provide a peak torque of 130.0 at 243 r.p.m. and 25° C. on a "Rotovisko" manufactured by Haake of West Germany, distributed by Brinkmann Instruments, Inc., Great Neck, N.Y. Employing the apparatus in the manner hereinbefore described, short gel readings for the solution containing the thickening agents were obtained by completely filling a petri dish. Tests were conducted under ambient conditions (i.e., 25° C.).

The short gel readings disclosed in Table I were taken respectively at 15, 45, 140 and 180 minutes after adjustment of the samples to a peak torque of 130.0.

TABLE I

| Run | Ingredient | Amount (grams) | Short gel readings (minutes) | | | |
|---|---|---|---|---|---|---|
| | | | 15 | 45 | 140 | 180 |
| A | Gelatinized tapioca starch, lot 1 | 32.7 | 16.7 | 18.8 | 20.2 | 20.3 |
| B | Gelatinized tapioca starch, lot 2 | 30.25 | 17.5 | 18.3 | 17.8 | 18.6 |
| C | Gelatinized tapioca starch, lot 3 | 28.95 | 18.6 | 18.7 | 18.5 | 18.4 |
| D | Carboxymethylcellulose | 7.5 | 37.9 | 30.7 | 39.3 | 36.7 |
| E | Guar gum | 13.0 | 21.2 | 21 | 20.8 | 29.7 |

From the aforementioned short gel readings, it is apparent that carboxymethylcellulose (i.e., Run D) is considerably more stringy than any of the other food thickening agents. In Runs A, B and C it may be seen from Table I that the tapioca starch from Runs A, B and C provide readings at 15, 45, 140 and 180 minutes which varied respectively about 21.6%.

$$\left(\text{i.e., } \frac{3.6}{16.7} \times 100\right), 6.3\% \left(\text{i.e., } \frac{1.1}{17.5} \times 100\right)$$

$$1.6\% \left(\text{i.e., } \frac{.3}{18.4} \times 100\right)$$

Prior subjective evaluation of aerated dessert products prepared from the tested tapioca starches indicated that the Run A tapioca was unstable, Run B tapioca had marginal stability and Run C tapioca provided exceptional product stability.

Example II

Utilizing the apparatus disclosed herein, short gel readings were ascertained for various gelatinized starch mixes containing the aforementioned Run C tapioca starch. The short gel readings, ingredients and amounts thereof are listed in Tables II and III.

In Runs 1–7, all of the ingredients were dry blended in a ribbon blender prior to the reconstitution thereof. The gel readings were obtained in the following manner:

(a) Hot water in the designated amounts was added to the blended dry mix (immediately followed);

(b) By mixing for 2 minutes with a standard household mixer operated at 600 r.p.m.;

(c) The cold water (in amounts designated) was then added;

(d) The resultant product was further blended with a standard household mixer for 1 minute at 600 r.p.m. and mixed an additional 2 minutes at 900 r.p.m.; and, (e) Short gel readings at 25° C., pursuant to Example I excepting the ascertainment of peak torque, were respectively taken at 15, 45, 140 and 180 minutes by completely filling a petri dish and removing any excess therefrom (i.e., above the petri dish rim) with a straight edge.

TABLE II.—INGREDIENTS (PARTS BY WEIGHT)

| Run No. | Starch | Water | GMS[1] | PGMS[2] | Sugar | Citric acid | Corn syrup | Salt | CMC | Short gel characteristics (minutes) | | | |
|---|---|---|---|---|---|---|---|---|---|---|---|---|---|
| | | | | | | | | | | 15 | 45 | 140 | 180 |
| 1 | 11.75 | [3]92.5+[4]92.5 | | | | | | | | 8.0 | 10.0 | 12.5 | 12.1 |
| 2 | 11.75 | [3]92.5+[4]92.5 | [5]0.35 | [5]0.53 | | | | | | 14.4 | 15.6 | 14.8 | 15.0 |
| 3 | 11.75 | [3]92.5+[4]94.5 | 0.88 | | | | | | | 14.7 | 10.7 | 7.3 | 6.9 |
| 4 | 11.75 | [3]92.5+[4]94.5 | [5]0.35 | [5]0.53 | 86 | | | | | 14.9 | 14.7 | 15.5 | 15.9 |
| 5 | 11.75 | [3]92.5+[4]94.5 | [5]0.35 | [5]0.53 | 52.8 | 0.82 | 33.2 | | 0.25 | 15.0 | 16.1 | 15.6 | 15.8 |

[1] Glyceryl monostearate.
[2] Propylene glycol monostearate.
[3] At 75° C.
[4] At 5° C.
[5] Fused mixture of 40 percent by weight GMS and 55 percent by weight PGMS.

TABLE III.—INGREDIENTS (PARTS BY WEIGHT)

| Run No. | Starch | Water | GMS | PGMS | Sugar | Citric acid | Corn syrup | Salt | CMC | Short gel characteristics (minutes) | | | |
|---|---|---|---|---|---|---|---|---|---|---|---|---|---|
| | | | | | | | | | | 15 | 45 | 140 | 180 |
| 6 | 11.75 | [3] 51.7+[4] 34.5 | [5] 0.35 | [5] 0.53 | 52.8 | 0.82 | 33.2 | | 0.25 | 19.6 | 21.4 | 21.0 | 21.8 |
| 7 | 11.75 | [3] 51.7+[4] 34.5 | | | [6] 52.8 | 0.82 | 33.2 | 0.35 | 0.25 | 53.7 | 81.0 | 81.8 | 81.0 |

[3] At 75° C.
[4] At 5° C.
[5] Fused mixture of 40 percent by weight GMS and 55 percent by weight PGMS.
[6] Boiling water was added.

Both Runs 1 and 7 were conducted in the absence of the propylene glycol monostearate and glyceryl monostearate. Although Run 1 provided a low reading (indicating a product of a fine, smooth, creamy consistency), sample instability is evidenced by the discrepancy in readings at 15, 45, 140 and 180 minutes. The product of Run 7 is extremely stringy as evidenced by the high, short gel reading. Improved product stability imparted by the combination of glycol monostearate and propylene glycol monostearate is indicated by the small discrepancy between the original and subsequent short gel readings in Runs 2, 4, 5 and 6. The short gel readings of Run 3 indicate that glyceryl monostearate per se does not provide a stable product. Runs 4, 5 and 6, which include additional dessert ingredients, provide stable products. Run 8 is similar to Run 3 in that it substantiates the necessity of propylene glycol monostearate to provide a stable product.

Example III

The apparatus hereinbefore described was employed to ascertain the short gel characteristics of various food products as well as changes accomplished by variable whipping times. Table IV sets forth the tested food products, degree of whipping, moisture content, density and the gel readings thereof.

TABLE IV

| Food product | Water (percent) | Whipping time (minutes) | Density | Gel reading |
|---|---|---|---|---|
| Marshallow (at 150° F.) | 15 | 0 | 0.39 | 50.5 |
| | | 2 | 0.88 | 81.0 |
| Whipping cream | 59 | 0 | 0.99 | |
| Whipped to soft peak | | 1 | 0.46 | 18.6 |
| Whipped to hard peak | | 1.25 | 0.43 | 8.8 |
| Whipped to buttery stage | | | 0.84 | 6.5 |
| Egg White (fresh) | 87.8 | 0 | 0.96 | 14.8 |
| Egg white (30 grams) and sugar (25 grams) | 47.8 | 0 | | |
| | | 1 | 0.51 | 20.8 |
| | | 2 | 0.38 | 18.1 |
| | | 5 | 0.25 | 10.0 |

What is claimed is:
1. a method for objectively measuring the short gel characteristics of ductile compositions, said method comprising:
  (a) providing a ductile composition mass;
  (b) adhesively engaging the surface of at least a portion of said mass;
  (c) withdrawing the adhesively engaged mass in the form of a filamentous mass at a constant speed;
  (d) continually withdrawing the mass until the filamentous mass ruptures; and,
  (e) ascertaining the short gel characteristics of the ductile composition by measuring the distance said filamentous mass has traversed until the rupture thereof.
2. The method according to claim 1 wherein the ductile composition is a food composition.
3. The method according to claim 2 wherein the composition is aerated.
4. The method according to claim 1 wherein steps (a) through (e) are repeated at a subsequent time interval and ascertaining the short gel character stability of the ductile composition mass by comparing the difference between the initial measurement thereof.
5. The method according to claim 4 wherein the product is a food composition.
6. The method according to claim 5 wherein the composition is aerated.
7. An apparatus for objectively measuring the short gel character of ductile compositions comprising a supporting member, a containing means provided on the supporting member for receiving and containing said composition, an adhesively engaging means carried by the supporting member adapted to adhesively engage the surface of said compositions, a separating means adapted to separate the containing means and engaging means and a measuring device adapted to ascertain the degree of separation between the containing means and engaging means.
8. The apparatus according to claim 7 wherein the containing means and engaging means are separated by the separating means in a vertical direction.
9. The apparatus according to claim 8 wherein the separating means provides a constant speed of separation between said engaging means and said containing means.
10. The apparatus according to claim 9 wherein the separating means is provided with a means for quickly stopping the separation between the engaging and the containing means.
11. The apparatus according to claim 10 wherein the engaging means contains a substantially flat surface member adapted to adhesively withdraw at least a portion of the composition from said containing means.
12. The apparatus according to claim 11 wherein the measuring device provides a means of ascertaining the degree of separation resulting from initial contact of the adhesively engaging means with the ductile composition and that achieved upon rupture of the filamentous mass being withdrawn from the containing mass.

References Cited

UNITED STATES PATENTS

| 2,756,587 | 7/1956 | Doble | 73—64.4 |
| 2,866,334 | 12/1958 | Rada et al. | 73—169 |
| 3,043,131 | 7/1962 | Heneage | 73—64.4 |
| 3,169,395 | 2/1965 | Enoch et al. | 73—169 |

FOREIGN PATENTS

| 733,686 | 10/1932 | France. |
| 812,256 | 3/1937 | France. |
| 1,211,821 | 3/1966 | Germany. |

LOUIS R. PRINCE, Primary Examiner

JOSEPH W. ROSKOS, Assistant Examiner

U.S. Cl. X.R.

73—169